United States Patent
Page et al.

(10) Patent No.: US 9,729,498 B2
(45) Date of Patent: Aug. 8, 2017

(54) DISTRIBUTED ADDRESS RESOLUTION PROTOCOL FORWARDING

(71) Applicant: Alcatel-Lucent USA Inc., Murray Hill, NJ (US)

(72) Inventors: Gregory G. Page, Sandy, UT (US); Sahil P. Dighe, Midvale, UT (US); Edgard Vargas, Moorpark, CA (US)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/462,050

(22) Filed: Aug. 18, 2014

(65) Prior Publication Data

US 2015/0341307 A1 Nov. 26, 2015

Related U.S. Application Data

(60) Provisional application No. 62/001,323, filed on May 21, 2014.

(51) Int. Cl.

| | |
|---|---|
| *H04L 12/28* | (2006.01) |
| *H04L 29/12* | (2006.01) |
| *H04L 29/06* | (2006.01) |
| *H04L 12/745* | (2013.01) |
| *H04L 12/741* | (2013.01) |
| *H04L 12/773* | (2013.01) |
| *H04L 12/947* | (2013.01) |

(52) U.S. Cl.
CPC ............ *H04L 61/103* (2013.01); *H04L 45/60* (2013.01); *H04L 45/74* (2013.01); *H04L 45/748* (2013.01); *H04L 49/25* (2013.01); *H04L 61/6009* (2013.01); *H04L 61/6077* (2013.01); *H04L 69/22* (2013.01); *H04L 61/6022* (2013.01)

(58) Field of Classification Search
CPC ............... H04L 61/103; H04L 61/6009; H04L 61/6077; H04L 45/60; H04L 49/25; H04L 45/74; H04L 69/22; H04L 45/748; H04L 61/6022

See application file for complete search history.

(56) References Cited

U.S. PATENT DOCUMENTS

| | | |
|---|---|---|
| 8,194,674 B1 | 6/2012 | Pagel |
| 2004/0013113 A1* | 1/2004 | Singh ................ H04L 29/12009 370/389 |
| 2010/0284407 A1* | 11/2010 | Leelanivas .............. H04L 45/04 370/392 |

(Continued)

OTHER PUBLICATIONS

PCT/US15/31878. Applicant: Alcatel-Lucent USA, Inc. Int'l Search Report & Written Opinion (Oct. 27, 2015).

*Primary Examiner* — Phuc Tran
(74) *Attorney, Agent, or Firm* — Loza & Loza, LLP

(57) ABSTRACT

A network device within a data communication network includes a plurality of network interfaces, each programmed with a respective set of Address Resolution Protocol (ARP) routing entries for correlating network addresses with physical addresses. Each network interface is further programmed with an additional respective set of Longest Prefix Match (LPM) routing entries for correlating other network addresses with designated network interfaces to enable traffic matching one of the LPM routing entries to be forwarded to the appropriate designated network interface within the network device.

20 Claims, 4 Drawing Sheets

(56) References Cited

U.S. PATENT DOCUMENTS

| | | |
|---|---|---|
| 2012/0127996 A1 | 5/2012 | Grosser |
| 2013/0094357 A1* | 4/2013 | Sankar .................. H04L 45/586 |
| | | 370/230 |
| 2014/0092901 A1* | 4/2014 | Kapadia ................ H04L 45/745 |
| | | 370/390 |
| 2014/0156667 A1* | 6/2014 | Kapadia ............ G06F 17/30946 |
| | | 707/741 |

* cited by examiner

DISTRIBUTED ADDRESS RESOLUTION PROTOCOL FORWARDING

CROSS-REFERENCE TO RELATED PATENTS

The present U.S. Utility patent application claims priority pursuant to 35 U.S.C. §119(e) to U.S. Provisional Application No. 62/001,323, entitled "Distributed ARP Forwarding", filed May 21, 2014, which is hereby incorporated herein by reference in its entirety and made part of the present U.S. Utility Patent Application for all purposes.

BACKGROUND OF THE INVENTION

Technical Field of the Invention

This invention relates generally to data communication networks and in particular to Address Resolution Protocol (ARP) forwarding within network devices.

Description of Related Art

Data communication networks allow many different computing devices, for example, personal computers, IP telephony devices and/or servers, to communicate with each other and/or with various other network elements or remote servers attached to the network. For example, data communication networks may include, without limitation, Metro Ethernet or Enterprise Ethernet networks that support multiple applications including, for example, voice-over-IP (VoIP), data and video applications. Such networks regularly include many interconnected nodes, commonly known as switches or routers, for routing traffic through the network.

The various nodes are often distinguished based on their location within particular areas of the network, commonly characterizing two or three "tiers" or "layers," depending on the size of the network. Conventionally, a three tier network includes an edge layer, an aggregation layer and a core layer (whereas a two tier network includes only an edge layer and core layer). The edge layer of data networks includes edge (also called access) networks that typically provide connectivity from a customer or home network, such as a local area network, to a metro or core network. The edge/access layer is the entry point of the network, i.e., to which the customer network is nominally attached, and the switches residing at the edge layer are known as edge switches. Different types of edge networks include digital subscriber line, hybrid fiber coax (HFC), fiber to the home and various customer networks, such as campus and data center networks. Edge switches may perform, for example, L2 switching functions for the attached devices. The edge switches are generally connected to one or more end devices in the customer network, and also to an aggregation layer that terminates access links coming from multiple edge switches. Switches residing at the aggregation layer are known as aggregation switches. Aggregation switches may perform, for example, L2 switching and L3 routing of traffic received via the aggregate links from the edge switches. The aggregation layer is connected to a metro or core network layer that performs Layer 3/IP routing of traffic received from the aggregation switches (in a three tier network) or from edge switches (in a two tier network). As will be appreciated, nodes at each incremental layer of the network typically have larger capacity and faster throughput.

Recently, there has been an explosion in the number of end devices handled by the switches/routers in data communication networks. This explosion, along with the continued demand for high performance throughput, has motivated administrators to deploy switches with off-the-shelf Application Specific Integrated Circuits (ASICs) that are more cost effective than proprietary ASICs with extended memory support. In general, the switches include a plurality of network interfaces (NIs), each including a routing ASIC. To be able to route traffic at wire-rate, the forwarding must be done by the routing ASIC on the network interface using tables programmed onto the ASIC. One such table is the Address Resolution Protocol (ARP) table, which is used for a direct-match between the destination IP address of the packet and a physical address, such as a Media Access Control (MAC) address.

However, the routing ASIC has fixed sized tables in hardware that can become a limitation in deployments needing more forwarding entries than are available. For example, when the ARP table (and/or related tables, e.g. the next-hop table) is full, the traffic destined for other IP addresses on the local subnet that could not be programmed in hardware gets trapped to the CPU of the network interface, and software performs the routing. This is undesirable as the software cannot achieve very high rates of routing.

Existing solutions have included building more expensive systems with larger on-chip tables or with expanded memory to increase the table size to accommodate every expected host. Nevertheless, the explosion in the number of end devices has resulted in administrators incurring the same problem on different scales over and over again. Adding larger tables to ASICs with expanded memory each time is not cost effective, and is not a viable solution long-term.

SUMMARY

Embodiments of the present disclosure are directed to distributed Address Resolution Protocol (ARP) forwarding in data communication networks. A network interface within a network device includes a memory and a packet processor. The memory has a first table and a second table stored therein. The first table includes a first set of routing entries for correlating network addresses with physical addresses. The second table includes a second set of routing entries for correlating network address ranges with additional network interfaces on the network device. The packet processor receives a packet including a destination address. When the destination address matches a matching network address in the first set of routing entries, the packet processor determines a physical address associated with the matching network address and converts the destination address to the physical address. When the destination address matches a matching network address range in the second set of routing entries, the packet processor determines an additional network interface associated with the matching network address range and forwards the packet to the additional network interface.

In another embodiment, a network device includes a switch fabric and a plurality of network interfaces coupled via the switch fabric. Each of the plurality of network interfaces includes a memory and a packet processor. The memory has a first table and a second table stored therein. The first table includes a first set of routing entries for correlating network addresses with physical addresses. The second table includes a second set of routing entries for correlating network address ranges with additional network interfaces on the network device. The packet processor receives a packet including a destination address. When the destination address matches a matching network address in the first set of routing entries, the packet processor determines a physical address associated with the matching network address and converting the destination address to the physical address. When the destination address matches a matching network address range in the second set of routing entries, the packet processor determines a designated network interface associated with the matching network address range and forwards the packet to the designated network interface via the switch fabric.

In still another embodiment, a method for distributed ARP forwarding in a network device includes receiving a packet including a destination address at a network interface of the network device and accessing, by the network interface, a first table including a first set of routing entries for correlating network addresses with physical addresses. When the destination address matches a matching network address in the first set of routing entries, the method further includes determining a physical address associated with the matching network address and converting the destination address to the physical address. When the destination address does not match any of the network addresses in the first set of routing entries, the method further includes accessing, by the network interface, a second table including a second set of routing entries for correlating network address ranges with additional network interfaces on the network device. When the destination address matches a matching network address range in the second set of routing entries, the method further includes determining a designated network interface associated with the matching network address range and forwarding the packet to the designated network interface via the network fabric.

In some embodiments of any of the above apparatus/methods, the network interface further includes a central processing unit (CPU) for resolving unknown network addresses and the second set of routing entries further correlates unknown network address ranges with the CPU. The packet processor further forwards the packet to the CPU when the destination address matches a matching unknown network address range in the second set of routing entries.

In some embodiments of any of the above apparatus/methods, the packet processor further compares the destination address with each of the network addresses in the first set of routing entries, identifies the matching network address when a match is found between the destination address and one of the network addresses in the first set of routing entries and compares the destination address with each of the network address ranges in the second set of routing entries when the destination address does not match any of the network addresses in the first set of routing entries.

In some embodiments of any of the above apparatus/methods, the destination address is an Internet Protocol (IP) address.

In some embodiments of any of the above apparatus/methods, the physical address is a Media Access Control (MAC) address.

In some embodiments of any of the above apparatus/methods, the first set of routing entries are Address Resolution Protocol (ARP) entries.

In some embodiments of any of the above apparatus/methods, the second set of routing entries are Longest Prefix Match (LPM) entries.

In some embodiments of any of the above apparatus/methods, the network interface further includes an Application Specific Integrated Circuit (ASIC) having the memory and the packet processor.

In some embodiments of any of the above apparatus/methods, the designated network interface has the destination address of the packet programmed thereon.

DETAILED DESCRIPTION OF THE INVENTION

Figure 1:
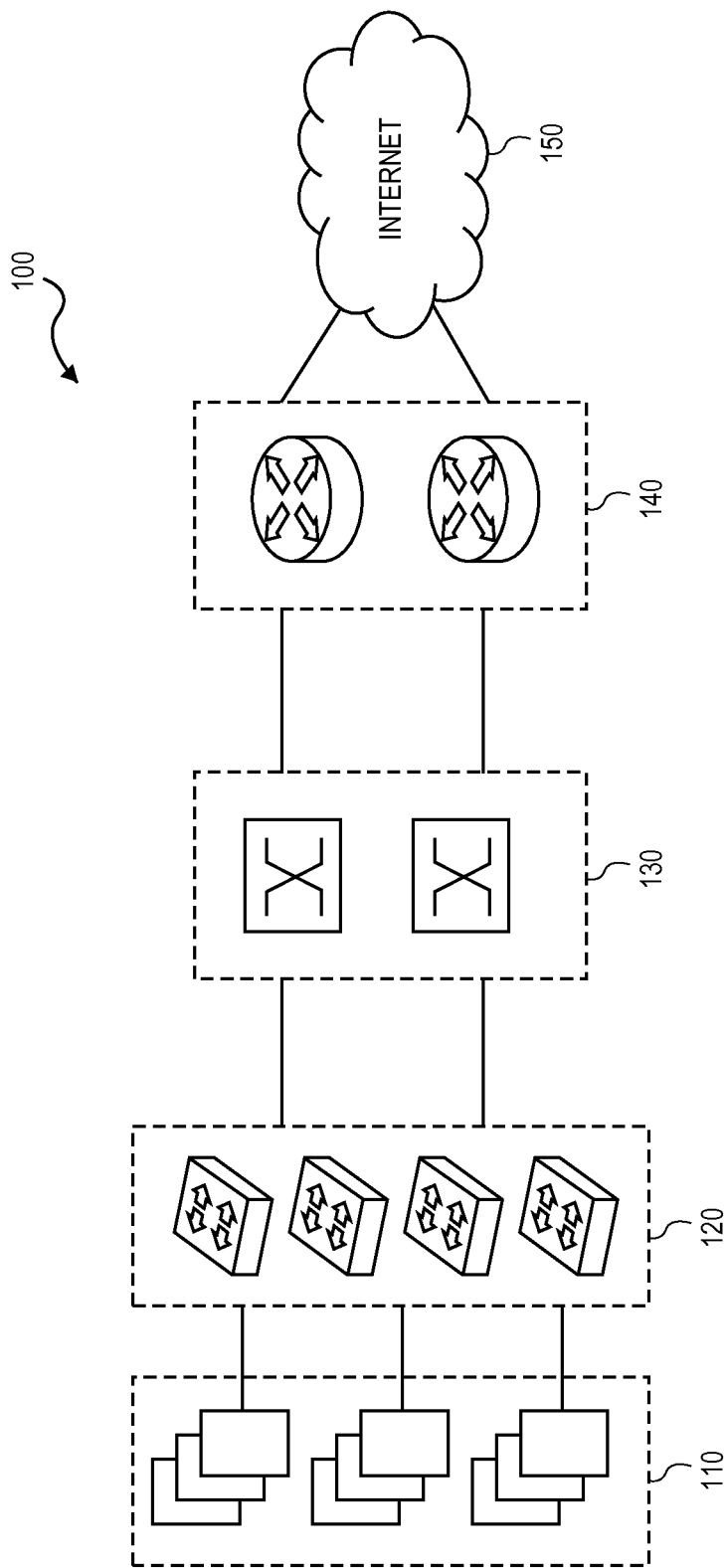
FIG. 1 illustrates a schematic block diagram of an exemplary data communication network.

FIG. 1 illustrates a schematic block diagram of an exemplary data communication network 100. The data communication network 100 shown in FIG. 1 represents a "three tiered" Ethernet network, including an edge layer, an aggregation layer and a core layer. However, in other embodiments, the data communication network may include only the edge layer and core layer.

The edge layer includes edge switches 120 that provide connectivity from end devices 110 within a customer network to the aggregation layer. The edge switches 120 may perform, for example, L2 switching functions for the end devices 110. The end devices 110 may include, for example, desktop computers, laptop computers, and other customer/end devices, such as customer switches, servers and/or other customer/end devices in the customer network.

The aggregation layer includes aggregation switches 130, each terminating access links coming from multiple edge switches. For example, aggregation switches 130 can perform L2 switching and L3 routing of traffic received via the aggregate links from edge switches 120. The aggregation layer is connected to a metro or core network that includes a plurality of core switches 140 that perform Layer 3/IP routing of traffic received from the aggregation switches 130.

In accordance with various embodiments, one or more of the edge switches 120, aggregation switches 130 and core switches 140 (referred to collectively herein as "network devices") are configured with distributed Address Resolution Protocol (ARP) forwarding. In one embodiment, for each network device having distributed ARP forwarding, the available ARP routing entries are divided into sets of ARP routing entries and each set of ARP routing entries is programmed onto one of the network interfaces of the network device. The network interfaces on the network device are also further configured to forward traffic to the appropriate network interface on the network device for handling of ARP forwarding.

Figure 2:
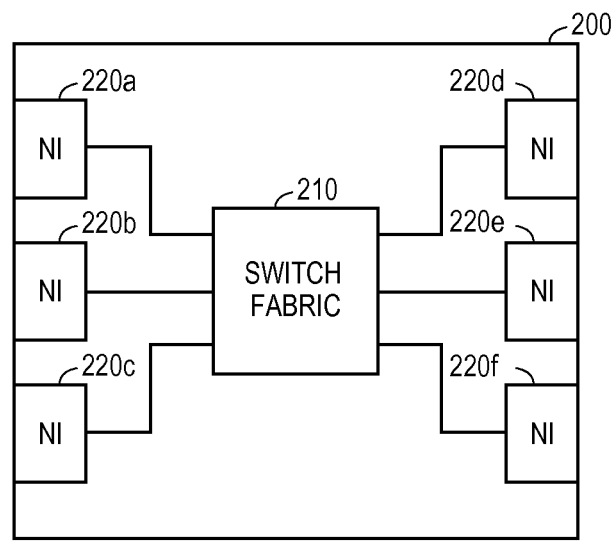
FIG. 2 illustrates a schematic block diagram of an embodiment of a network device within a data communication network.

FIG. 2 illustrates an exemplary embodiment of a network device 200 capable of implementing distributed ARP forwarding. The network device 200 includes a switch fabric 210 and a plurality of network interfaces 220a-220f coupled via the switch fabric 210. The network interfaces 220a-220f are each coupled to one or more ports (not shown) that provide connections to links to external upstream and/or downstream switches or end devices.

In one embodiment, each network interface 220a-220f is programmed with a respective set of ARP routing entries, such that each set of ARP routing entries is programmed on only one designated network interface. For example, the available ARP routing entries are divided into sets of ARP routing entries and each set of ARP routing entries is stored on one of the network interfaces 220a-220f of the network device 200. In an exemplary embodiment, there is no overlap of ARP routing entries between network interfaces. In other embodiments, one or more ARP routing entries may be included in two or more sets of ARP routing entries, such that there is at least a partial overlap of ARP routing entries between network interfaces.

The designated network interface(s) for each ARP routing entry may be selected using various methods. In an exemplary embodiment, for each set of ARP routing entries, the designated network interface for the set of ARP routing entries is selected based on where the maximum number of ports of the underlying Virtual Local Area Network (VLAN) for the set of ARP routing entries exists.

In addition, each of the network interfaces 220a-220f further maintains designated network interface information that enables traffic to be forwarded to the appropriate designated network interface on the network device 200. Thus, for example, a packet received at network interface 220a having a network destination address that is associated with an ARP routing entry maintained on network interface 220f can be forwarded from network interface 220a to network interface 220f via switch fabric 210. Network interface 220f can then perform the ARP lookup to convert the network destination address (i.e., an Internet Protocol (IP) address) to the physical destination address (i.e., a Media Access Control (MAC) address) and forward the packet using the physical destination address. In an exemplary embodiment, the designated network interface information is a table of Longest Prefix Match (LPM) routing entries, each pointing to the appropriate designated network interface.

In an exemplary operation, upon receiving a packet at network interface 220a, the network interface 220a performs a lookup into the ARP routing table to determine if an exact match exists between the destination address and the set of ARP routing entries programmed on that network interface 220a. If an exact match does exist, the network interface 220a performs the ARP lookup to convert the destination address to the physical address associated with the destination device. If an exact match does not exist, the network interface 220a accesses the LPM routing entry table to determine whether another network interface on the network device 200 is the designated network interface for that destination address. If another designated network interface (i.e., network interface 220f) is identified, network interface 220a forwards the packet to the designated network interface 220f via switch fabric. If the destination address is unknown (e.g., the destination address is not included in any of the sets of ARP routing entries on the network device), the packet is trapped to the CPU of the network interface 220a to resolve the ARP.

Since each network interface 220a-220f has a distinct set of ARP entries, the network device 200 can support a large number of ARPs. In previous solutions utilizing synchronized ARPs, if each network interface 220a-220f can support 16K ARP entries, then that is all that the entire network device 200 can support. By dividing the ARP entries amongst the network interfaces 220a-220f, with N network interfaces 220a-220f, the network device 200 can support N*16K ARP entries. In the example shown in FIG. 2 having 6 network interfaces, the network device can support up to 96K ARP entries (6 NIs×16K). Thus, the capacity of the network device is able to grow as more network interfaces are added. In addition, the distributed ARP forwarding mechanism can be applied to both chassis-based systems and to virtual chassis-based systems.

Figure 3:
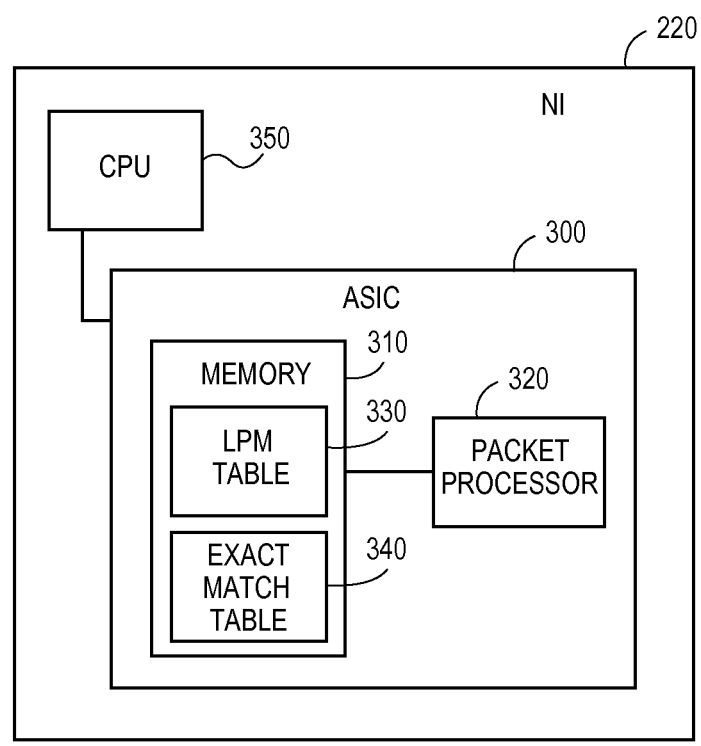
FIG. 3 illustrates a schematic block diagram of an embodiment of a network interface within a network device.

FIG. 3 illustrates a schematic block diagram of an embodiment of a network interface 220 within a network device. The network interface 220 includes a routing Application Specific Integrated Circuit (ASIC) 300 and a Central Processing Unit (CPU) 350. The routing ASIC 300 includes a memory 310 and a packet processor 320. As used herein, the terms "processor" and "central processing unit" are generally understood to be devices that are capable of driving a general-purpose computer, such as a PC. It is noted, however, that the packet processor 320 and/or CPU 350 may include other processing devices, such as microcontrollers, Field Programmable Gate Arrays (FPGAs), multi-core processors or a combination thereof.

The memory 310 includes a Longest Prefix Match (LPM) table 330 and an exact match table 340. The LPM table 330 includes a set of LPM routing entries for correlating partial network addresses (or network address ranges) with designated network interfaces on the network device. The LPM table 330 further includes LPM routing entries for correlating unknown partial network addresses (or network address ranges) with the CPU 350. Thus, each LPM routing entry in the LPM table 330 points to either another network interface or the CPU. The exact match table 340 includes a set of ARP routing entries for correlating network addresses with physical addresses. The ARP routing entries may be, for example, IPv4 ARP entries or IPv6 Neighbor entries, where the IPv6 Neighbor entries behave like IPv4 ARP entries. By way of example, but not limitation, the memory 220 may include one or more a data storage device, random access memory (RAM), read only memory (ROM), flash memory, database or other type of storage device or storage medium.

The packet processor 320 is configured to process packets received at the network interface 220 from an external port or from another network interface. In an exemplary operation, upon receiving a packet at the routing ASIC 300, the packet processor 320 extracts the destination address (i.e., IP address) from the header of the packet and compares the destination address with each of the network addresses in the ARP routing entries of the exact match table 340. If an exact match is found, the packet processor 320 performs a lookup on the ARP routing entry having the matching network address to determine the physical address (i.e., MAC address) associated with the matching network address and converts the network address to the physical address.

If an exact match is not found in the exact match table 340, the packet processor 320 accesses the LPM table 330 to compare the destination address with each of the partial network addresses (or network address ranges) in the LPM routing entries of the LPM table 330. If a match is found between the destination address and a partial network address in the LPM table 330, the packet processor 320 performs a lookup on the LPM routing entry having the matching partial network address to determine whether to route the packet to another network interface or the CPU 350. For example, if the LPM routing entry having the matching partial network address points to another designated network interface, the packet processor 320 forwards the packet to the designated network interface. As another example, if the LPM routing entry having the matching partial network address points to the CPU 350, the packet processor 320 traps the packet to the CPU 350 to resolve the ARP.

Figure 4:
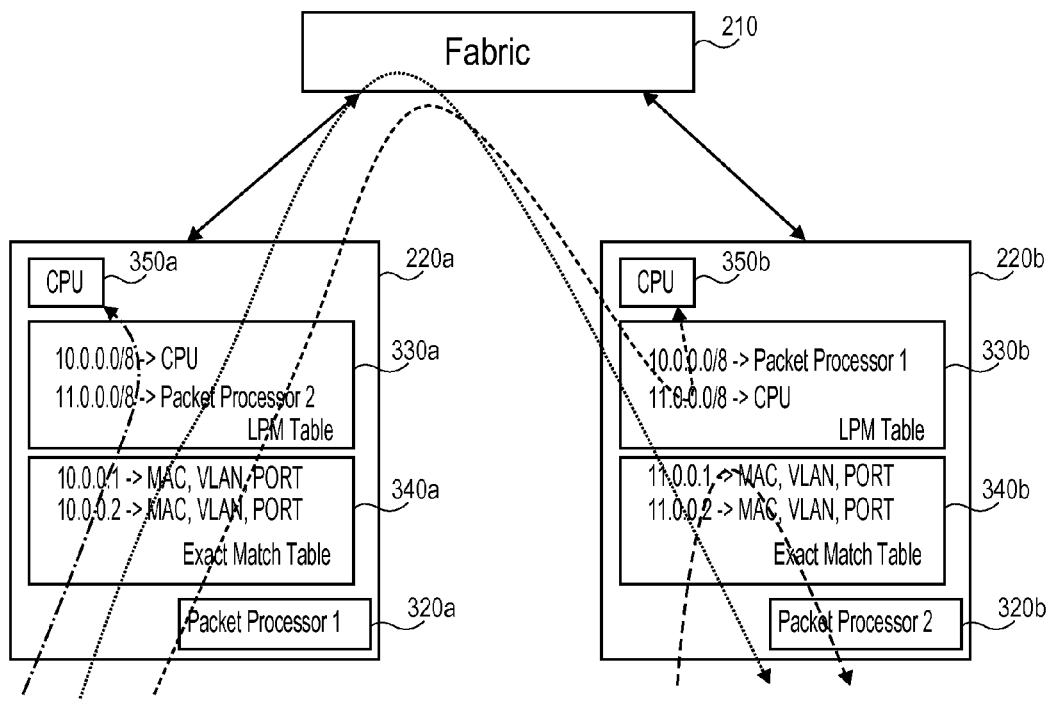
FIG. 4 illustrates an exemplary diagram of an embodiment of forwarding packets within a network device in a data communication network.

FIG. 4 illustrates an exemplary diagram of an embodiment of forwarding packets within a network device in a data communication network. In FIG. 4, two network interfaces 220a and 220b are shown interconnected via the switch fabric 210. Network interface 220a includes packet processor 320a (Packet Processor 1), exact match table 340a, LPM table 330a and CPU 350a. Network interface 220b includes packet processor 320b (Packet Processor 2), exact match table 340b, LPM table 330b and CPU 350b.

For ease of illustration only, each of the exact match tables 340a and 340b includes two ARP routing entries. For example, exact match table 340a provides the corresponding MAC address, VLAN and port for each of two destination IP address, 10.0.0.1 and 10.0.0.2. As another example, exact match table 340b provides the corresponding MAC address, VLAN and port for destination IP addresses 11.0.0.1 and 11.0.0.2.

In addition, for ease of illustration only, each of the LPM tables 330a and 330b includes two LPM routing entries. One of the LPM routing entries in each LPM table 330a and 330b points to the respective CPU 350a and 350b of the network interface 220a and 220b, while the other LPM routing entry in each LPM table 330a and 330b points to the other network interface. For example, in LPM table 330a, the second LPM routing entry indicates that packets having a destination (network) address in the range of 11.0.0.0/8 should be forwarded to Packet Processor 2. As another example, the first LPM routing entry in LPM table 330b indicates that packets having a destination (network) address in the range of 10.0.0.0/8 should be forwarded to Packet Processor 1.

Exemplary forwarding of four different sample packets is also shown in FIG. 4. The first packet has a destination IP address of 10.0.0.3 and is received at network interface 220a. The first packet is trapped to the CPU 350a of network interface 220a based on the first LPM routing entry in the LPM table 330a. The second packet has a destination address of 11.0.0.2 and is also received at network interface 220a. The second packet is forwarded to network interface 220b via switch fabric 210 based on the second LPM entry in the LPM table 330a. Network interface 220b then converts the destination IP address to the corresponding MAC address based on the second ARP routing entry in the exact match table 340b.

The third packet has a destination IP address of 11.0.0.3 and is received at network interface 220a. The third packet is forwarded to network interface 220b via switch fabric 210 based on the second LPM entry in the LPM table 330a. Network interface 220b then traps the second packet to the CPU 350b based on the second LPM routing entry in the LPM table 330b. The fourth packet has a destination IP address of 11.0.0.1 and is received at network interface 220b. The packet processor 320b converts the destination IP address of the fourth packet to the corresponding MAC address based on the first ARP routing entry in the exact match table 340b.

Figure 5:
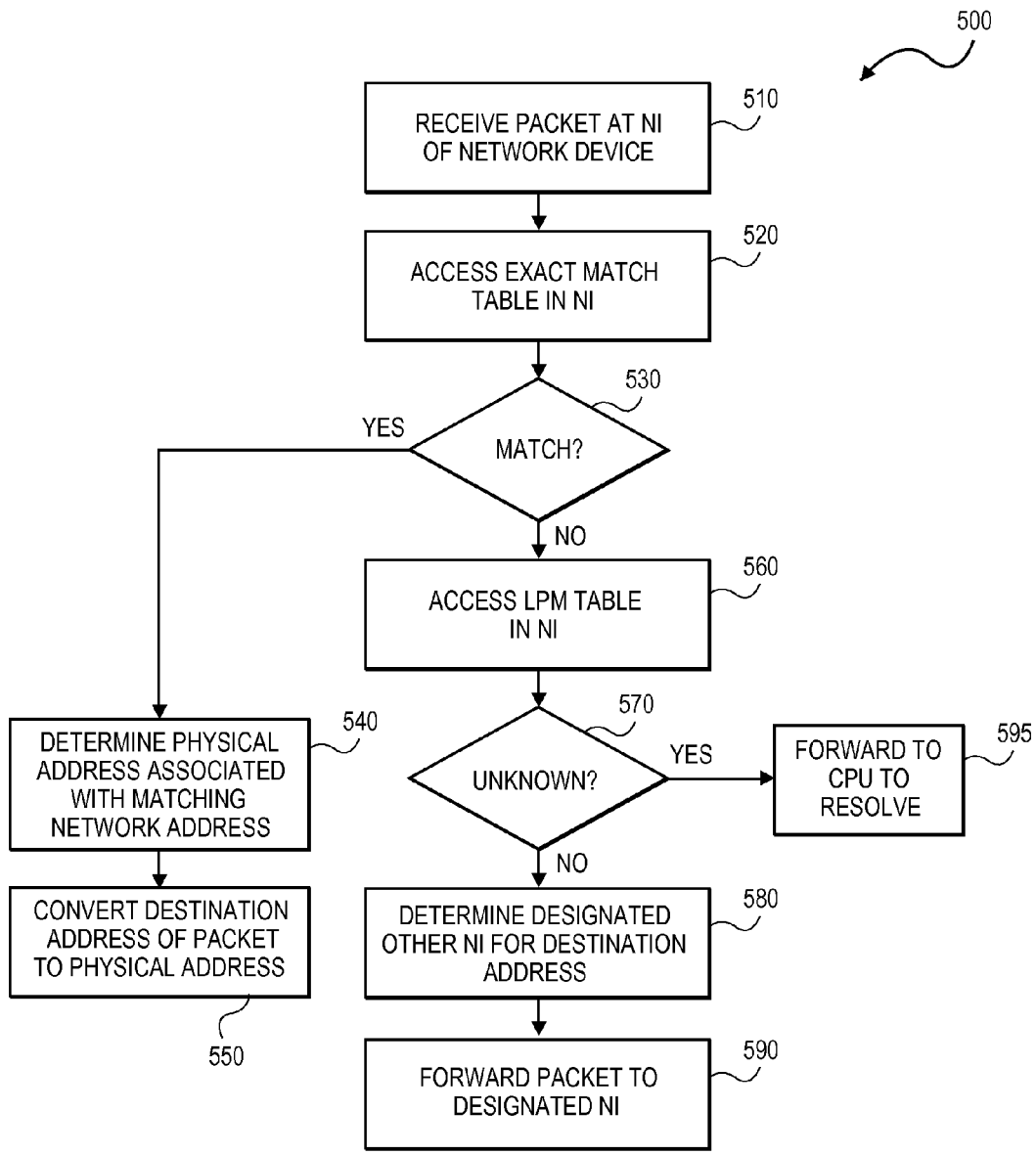
FIG. 5 illustrates an exemplary flow diagram of a method for distributed Address Resolution Protocol (ARP) forwarding within a network device in a data communication network.

FIG. 5 illustrates an exemplary flow diagram of a method 500 for distributed ARP forwarding within a network device in a data communication network. The method begins at 510, where a packet is received at a network interface (NI) of a network device. At 520, a packet processor within the network interface accesses an exact match table programmed in hardware on the network interface. At 530, the packet processor determines whether an exact match exists between a destination address of the packet and a network address within one of the routing entries in the exact match table. If an exact match does exist, at 540, the packet processor determines a physical address associated with the matching network address, and at 550, converts the destination address of the packet to the physical address.

If an exact match does not exist, at 560, the packet processor accesses a LPM table programmed in hardware on the network interface. At 570, the packet processor determines whether the destination address of the packet matches an unknown partial network address within one of the routing entries in the LPM table. If the destination address matches a matching unknown partial network address, the packet processor forwards the packet to the CPU within the network interface to resolve the ARP. If the destination address does not match a matching unknown partial network address, at 580, the packet processor determines a matching partial network address for the destination addresses and identifies the designated network interface on the network device for the matching partial network address. At 590, the packet processor then forwards the packet to the designated network interface to perform the ARP lookup.

As used herein, the term Address Resolution Protocol (ARP) refers to the protocol defined in Network Working Group Request for Comments 826, released in November 1982 and updates thereto. In addition, as used herein, the term Longest Prefix Match (LPM) (also called Maximum Prefix Length Match) refers to an algorithm used by routers in Internet Protocol (IP) networking. The LPM entry refers to the routing entry in a routing table that has the highest subnet mask match to a destination address. For example, the LPM entry is the routing entry having the largest number of leading address bits match those of the destination address.

As may be used herein, the term "operable to" indicates that an item includes one or more of processing modules, data, input(s), output(s), etc., to perform one or more of the described or necessary corresponding functions and may further include inferred coupling to one or more other items to perform the described or necessary corresponding functions. As may also be used herein, the term(s) "connected to" and/or "connecting" or "interconnecting" includes direct connection or link between nodes/devices and/or indirect connection between nodes/devices via an intervening item (e.g., an item includes, but is not limited to, a component, an element, a circuit, a module, a node, device, etc.). As may further be used herein, inferred connections (i.e., where one element is connected to another element by inference) includes direct and indirect connection between two items in the same manner as "connected to". As may also be used herein, the term(s) "coupled to" and/or "coupling" and/or includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may still further be used herein, inferred coupling (i.e., where one element is coupled to another element by inference) includes direct and indirect coupling between two items in the same manner as "coupled to".

Embodiments have also been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Similarly, flow diagram blocks may also have been arbitrarily defined herein to illustrate certain significant functionality. To the extent used, the flow diagram block boundaries and sequence could have been defined otherwise and still perform the certain significant functionality. One of average skill in the art will also recognize that the functional building blocks, and other illustrative blocks, modules and components herein, can be implemented as illustrated or by one or multiple discrete components, networks, systems, databases or processing modules executing appropriate software and the like or any combination thereof.

What is claimed is:

1. A network interface within a network device, comprising:
   a memory having a first table and a second table stored therein;
   the first table including a first set of routing entries for correlating network addresses with physical addresses, wherein the first table is different from routing tables for correlating network addresses with physical addresses in a plurality of additional network interfaces within the network device;
   the second table including a second set of routing entries for correlating each of a set of prefixes of network addresses to one of the plurality of additional network interfaces on the network device; and
   a packet processor for:
      receiving a packet including a destination address;
      when the destination address matches a matching network address in the first set of routing entries, determining a physical address associated with the matching network address and converting the destination address to the physical address;
      determining the destination address fails to match a network address in the first set of routing entries;
      determining the prefix of the destination address matches at least one of the set of prefixes of network addresses in the second set of routing entries; and
      determining one of the plurality of additional network interfaces within the network device associated with the prefix of the destination address and forwarding the packet to the additional network interface, wherein the additional network interface is configured with another routing table including the destination address and associated physical destination address.

2. The network interface of claim 1, further comprising:
   a central processing unit (CPU) configured for resolving unknown network addresses;
   wherein the second set of routing entries in the second table correlates each of another set of prefixes of network addresses to the CPU; and
   wherein the packet processor is further configured for:
      determining the prefix of the destination address matches at least one of the another set of prefixes of network addresses and forwarding the packet to the CPU for resolving the unknown destination address.

3. The network interface of claim 1, wherein the packet processor further:
   compares the destination address with each of the network addresses in the first set of routing entries;
   identifies the matching network address when a match is found between the destination address and one of the network addresses in the first set of routing entries; and
   compares the destination address with the second set of routing entries when the destination address does not match any of the network addresses in the first set of routing entries.

4. The network interface of claim 1, wherein the destination address is an Internet Protocol (IP) address.

5. The network interface of claim 1, wherein the physical address is a Media Access Control (MAC) address.

6. The network interface of claim 1, wherein the first set of routing entries are Address Resolution Protocol (ARP) entries.

7. The network interface of claim 1, wherein the second set of routing entries are Longest Prefix Match (LPM) entries.

8. The network interface of claim 1, further comprising:
   an Application Specific Integrated Circuit (ASIC) having the memory and the packet processor.

9. A network device, comprising:
   a switch fabric; and
   a plurality of network interfaces coupled via the switch fabric, each of the plurality of network interfaces including:
   a memory configured for storing:
      a first table including a first set of routing entries for correlating network addresses with physical addresses, wherein each of the plurality of network interfaces includes a different first table that correlates a different set of network addresses with physical addresses; and
      a second table including a second set of routing entries for correlating each of a set of prefixes of network addresses to one of the plurality of network interfaces, wherein each prefix corresponds to a range of network addresses in one of the different sets of network addresses in one of the different first tables of the plurality of network interfaces; and
   a packet processor for:
      receiving a packet including a destination address;
      when the destination address matches a matching network address in the first set of routing entries, determining a physical address associated with the matching network address and converting the destination address to the physical address;
      comparing a prefix of the destination address to the set of prefixes of network addresses;
      determining the prefix of the destination address matches at least one of the set of prefixes of network addresses in the second set of routing entries; and
      determining a designated one of the plurality of network interfaces within the network device associated with the prefix of the destination address and forwarding the packet to the designated one of the plurality of network interfaces.

10. The network device of claim 9, wherein each of the plurality of network interfaces is programmed with a distinct set of network addresses such that each of the network addresses is programmed on a single one of the plurality of network interfaces.

11. The network device of claim 10, wherein the designated network interface has the destination address of the packet programmed thereon.

12. The network device of claim 9, wherein each of the plurality of network interfaces further includes:
   a central processing unit (CPU) for resolving unknown network addresses;
   wherein the second set of routing entries further correlates unknown partial network addresses with the CPU;

wherein the packet processor further forwards the packet to the CPU when the destination address matches a matching unknown partial network address in the second set of routing entries.

13. The network device of claim 9, wherein the packet processor further:
   compares the destination address with each of the network addresses in the first set of routing entries;
   identifies the matching network address when a match is found between the destination address and one of the network addresses in the first set of routing entries; and
   compares the destination address with each of the partial network addresses in the second set of routing entries when the destination address does not match any of the network addresses in the first set of routing entries.

14. The network device of claim 9, wherein the network addresses are Internet Protocol (IP) addresses.

15. The network device of claim 9, wherein the physical addresses are Media Access Control (MAC) addresses.

16. The network device of claim 9, wherein the first set of routing entries are Address Resolution Protocol (ARP) entries.

17. The network device of claim 9, wherein the second set of routing entries are Longest Prefix Match (LPM) entries.

18. The network device of claim 9, wherein each of the plurality of network interfaces includes an Application Specific Integrated Circuit (ASIC).

19. A method for distributed Address Resolution Protocol (ARP) forwarding in a network device, comprising:
   receiving a packet including a destination address at a network interface of the network device;
   accessing, by the network interface, a first table including a first set of routing entries for correlating network addresses with physical addresses;
   when the destination address matches a matching network address in the first set of routing entries, determining a physical address associated with the matching network address and converting the destination address to the physical address;
   determining that the destination address does not match any of the network addresses in the first set of routing entries and accessing, by the network interface, a second set of routing entries including a plurality of sets of prefixes of network addresses, wherein each of the plurality of sets of prefixes of network addresses is associated with one of the plurality of network interfaces; and
   determining that a prefix of the destination address matches a prefix in one of the plurality of sets of prefixes of network addresses in the second set of routing entries; and
   determining a designated network interface associated with the matching prefix and forwarding the packet to the associated network interface via the network fabric.

20. The method of claim 19, wherein the second set of routing entries further correlates unknown partial network addresses with a central processing unit (CPU) in the network device, and further comprising:
   forwarding the packet to the CPU when the destination address matches a matching unknown partial network address in the second set of routing entries.

* * * * *